United States Patent [19]

Ehrhart et al.

[11] Patent Number: 5,140,088
[45] Date of Patent: Aug. 18, 1992

[54] HIGH TG SURFACE COVERING WEAR LAYER AND SEAM COATER

[75] Inventors: Wendell A. Ehrhart, Red Lion; James R. Petzold, Lancaster, both of Pa.

[73] Assignee: Armstrong World Industries, Inc., Lancaster, Pa.

[21] Appl. No.: 643,214

[22] Filed: Jan. 22, 1991

[51] Int. Cl.$^5$ .............................................. C08G 18/30
[52] U.S. Cl. ...................................................... 528/59
[58] Field of Search ......................................... 528/59

[56] References Cited

U.S. PATENT DOCUMENTS

| | | | |
|---|---|---|---|
| 4,260,717 | 4/1981 | Ehrhart | 528/59 |
| 4,440,901 | 4/1984 | Reiff et al. | 528/59 |
| 5,004,794 | 4/1991 | Emmerling et al. | 528/59 |

*Primary Examiner*—Maurice J. Welsh

[57] ABSTRACT

The floor covering of the present invention has a wear layer and/or seam coater which is a high $T_g$ urethane composition. While most floor covering urethanes have a $T_g$ of from 18° C. to 23° C., the $T_g$ of the present urethane is above about 40° C., and preferably from about 48° C. to about 55° C. The $T_g$ of the prior art has been increased by altering the composition of the aromatic acid based polyester polyols used in the prior art moisture curable prepolymers. By raising the precursor polyol to dicarboxylic acid ratio, the polyester polyols produced have lower equivalent weights. This alone results in a polyurethane-urea of higher $T_g$ at a given alicyclic diisocyanate to polyester equivalent ratio. However, increases in the $T_g$ may also be obtained by replacing some or all of long chain flexible polyol precursors (e.g. triethylene glycol) with shorter and/or less flexible polyol precursors. The high $T_g$ improves stain resistance. The moisture cure of the present urethane composition can be carried out at ambient conditions, permitting its use as a seam coater or sealer as well as a wear layer.

20 Claims, No Drawings

HIGH TG SURFACE COVERING WEAR LAYER AND SEAM COATER

BACKGROUND OF THE INVENTION

1. Field of the Invention

The invention relates to a floor covering. Particularly, the invention relates to a floor covering wear layer and seam coater, and more particularly to a floor covering having a urethane component which has a glass transition temperature or $T_g$ of at least about 40° C. The urethane component may be a wear layer or seam coater, or both.

2. Background of the Invention

Floor coverings including resilient floor coverings are well known in the art. The floor coverings which are in wide use today are primarily of vinyl construction and, although they can be constructed to have varying degrees of flexibility, they are "resilient" when compared to conventional natural materials, such as ceramic tile. The term "resilient" describes the characteristic of a floor covering to recover from the indentation made by a heavy object such as a refrigerator.

A variety of such products are commercially available and these products have proven to exhibit good wear resistance. However, such coverings are not without certain deficiencies. For example, although vinyl flooring products are durable and stain resistant, they nevertheless tend to lose their glossy appearance through wear. A high-gloss appearance for a floor covering is often desired. Accordingly, the manufacturers of such materials have long sought to find improved floor coverings which exhibit good gloss retention.

One method of providing improved gloss retention is through the application of polyurethane or other wear layers to vinyl flooring structures. Nevertheless, these wear layers, and in particular polyurethane wear layers, also have certain drawbacks. For example, they are more susceptible to staining. Thus, when exposed to common household stains as ballpoint pen, lipstick, mustard, shoe polish and the like, polyurethane coatings tend to be more easily stained than vinyl coatings.

This staining problem has at least been diminished by using polyurethane thinly covered by other more highly crosslinked wear layers, including a coating formed by thermally curing a surface covering composition of an aminoplast component, a polyol component, an acid catalyst component, and an optional vinyl resin component. Such wear layers are disclosed in Bolgiano et al. U.S. Pat. No. 4,781,987 and Witman U.S. Pat. No. 4,935,286, for example.

Because of the crosslinking and few chemically reactive sites on the surface of such wear layers, it has been difficult to find compositions which adhere to the surfaces and which have good enough stain and wear resistance to be used as seam coaters to prevent the buildup of dirt and penetration of moisture between the seams of surface coverings, particularly floor coverings, having such wear layers. The wear layer composition itself cannot be practically used as a seam coater or sealer since it is thermally cured. One solution has been to use a cyanoacrylate based composition. However, the cyanoacrylate composition releases objectionable fumes.

Additional polyurethane surface coatings are disclosed in Conger et al. U.S. Pat. No. 4,059,709, Haemer et al. U.S. Pat. No. 4,298,646 and Boba et al. U.S. Pat. No. 4,393,187. The polyurethane/urea compositions of the prior art which are used as wear layers have a low $T_g$. That is, they have glass transition temperatures in the range of about 18° C. to about 23° C.

One objective of the present invention is to provide a seam coating composition which can be used with the polyurethane wear layers and the aminoplast wear layers of the prior art.

Another objective of the present invention is to provide a composition which can be used as the wear layer composition itself as well as the seam coater.

Further object of the present invention is to provide a wear layer composition which has good stain resistance, gloss retention under foot traffic, alkali resistance and reasonable curing time.

These and other advantages of the present invention will become apparent from the detailed description of the preferred embodiments which follow.

SUMMARY OF THE INVENTION

It has been discovered that by raising the $T_g$ to above about 40° C., preferably about 48° C. to about 55° C., the stain resistance of the prior art polyurethane/urea compositions is improved and is similar to the aminoplast compositions of the Bolgiano et al. and Witman references discussed above. Furthermore, the gloss retention and soiling characteristics are similar to those of the Bolgiano and Witman coatings. The $T_g$ has been increased in the Desmodur W/polyester polyol family of polyurethane-ureas by lowering the equivalent weight of the polyester polyol from greater than 900 for most prior art formulas to the 200 to 700 range and/or by replacing long chain flexible glycols and/or triols of the prior art with shorter and/or less flexible (i.e. containing rings, methyl, branches, etc.) glycols and/or triols.

Moisture curable, NCO terminated prepolymers are prepared from these polyesters having an NCO:OH ratio from about 1.05 to about 3.5, preferably from about 1.4 to about 2.6. The high $T_g$ polyurethane-ureas are obtained by allowing the NCO terminal groups to react with water (usually ambient moisture) and allowing the solvent to evaporate. The reaction with moisture and/or drying can be carried out rapidly at elevated temperatures or can be allowed to occur over a longer period of time at room temperature. This family of high $T_g$ polyurethane-ureas utilizes an alicyclic diisocyanate.

A second family of high $T_g$ wear layers are formed by the reaction with water of prepolymers comprising the NCO terminated, multi-functional oligomers of 1,6-hexamethylenediisocyanate and up to about 30 weight percent of the polyester polyols described above. The NCO to OH ratios in this family may range from about 5:1 to well over 100:1.

A third family is obtained by blending the prepolymers of the first two families or by blending the isocyanates themselves with one or more prepolymers of either or both families.

DETAILED DESCRIPTION OF THE INVENTION

The first embodiment is obtained by preparing a hydroxy terminated polyester, reacting the polyester with, for example, an excess of a diisocyanate, laying down the composition on a floor covering substructure, and curing the composition. The preferred polyester polyol has an equivalent weight of 250 to 550, and is the reaction product of one or more aromatic dicarboxylic acids or anhydrides and an equivalent excess of generally more than one polyol selected from the group consisting of diethylene glycol, 1,6 hexanediol, 1,4-butanediol, 1,4-cyclohexanedimethanol, 2-methyl-1,3-propanediol, ethylene glycol, glycerine, trimethylolpropane, trimethylolethane, triethylene glycol, 1,3-butane diol, and 1,2-propanediol. The higher the equivalent weight of the polyester polyol (determined by the amount of excess polyol), the less of the longer, flexible polyols such a triethylene glycol can be used. Aliphatic dicarboxylic acids can be used as partial replacements for the aromatic ones. However, if used in substantial amounts, they need to be off set by polyols of low flexibility (eg. 1,4-cyclohexanedimethanol) and/or low equivalent weight. Multiple ingredients generally help avoid insolubility due to crystallization.

One preferred polyester has an equivalent weight of about 525 and is the reaction product of about 0.175 eq. of triethylene glycol, about 0.625 eq. of diethylene glycol, about 0.275 eq. of isophthalic acid. The diisocyanate is preferably a cycloalkyl derivative, such as bis(4-isocyanatocyclohexyl)methane, tetramethylxylenediisocyanate or isophoronediisocyanate. The most preferred polyester has an equivalent weight of about 300 and is the reaction product of a composition comprising phthalic anhydride, isophthalic acid, and 1,6-hexanediol.

EXAMPLE 1

An hydroxy terminated polyester (polyester polyol) was made by charging a five liter flask equipped with an upright partial condenser, stirrer, and thermometer with 1846 grams of isophthalic acid, 292 grams of triethylene glycol, 737 grams of diethylene glycol, 137 grams of glycerine, 190 grams of ethylene glycol, and 0.32 grams of dibutylstannoic acid catalyst. The reactants were stirred under nitrogen at a maximum temperature of 220° C., while gradually increasing the nitrogen flow to 1.5 scfh. These conditions were then maintained until the acid number dropped to below 0.5, yielding about 2800 grams of an hydroxy terminated polyester with an equivalent weight of 524.

A one liter flask with a Barrett trap was charged with stirring at room temperature with 396 g. plus 40 ml. of methyl ethyl ketone (MEK) solvent and 174 g. of the above polyester polyol. The mixture was azeotropically dried by distilling 40 ml of MEK under 0.1 scfh of dry nitrogen. The composition was cooled to room temperature and the flask was rapidly charged in order with 89.8 grams of Desmodur W (dicyclohexylmethane-4,4'-diisocyanate) and 1.32 grams of dimethyltin dineodecanoate catalyst. The temperature was then raised to 75° C. and held for two hours. The composition was then cooled to near room temperature under nitrogen and charged with 0.528 g. of the UV screener, UV 5411, manufactured by American Cyanamid, to screen out UV rays and deter yellowing.

Two draw downs of the composition were made on glass with a three mil blade, dried and cured. One draw down was cured at 140° C. for 30 min. in a forced draft oven. The other was cured under ambient conditions. In both cases, the atmospheric water vapor reacted with the NCO groups present. The oven cured film had a midpoint DSC $T_g$ of 56° C. After 23 days the film, cured and dried under ambient conditions, had achieved a $T_g$ of 48° C. and was very resistant to nearly all household stains.

These films are much higher in elongation than the Bolgiano et al. films. They can be used either as a thin layer over other clear coatings or as a single clear coating of up to about four mils without causing cracking problems during manufacture or installation.

In the second embodiment the urethane component is the reaction product of a composition including a polyurethane prepolymer prepared by the reaction of a isocyanato terminated, multifunctional, aliphatic isocyanate oligomer of hexamethylene diisocyanate, a polyol and water. Examples of the oligomer include N,N,N triisocyanatohexamethylene isocyanurate trimers and biurets of hexamethylene diisocyanate. The NCO terminated oligomers include Desmodur N-100, N-3300, N-3320, and N-3390 which are sold by Mobay Chemical Company. The Desmodur N-100 is a biuret of hexamethylene diisocyanate. The polyol is preferably a polyester polyol, and more preferably the reaction product of a polyol and phthalic anhydride and/or isophthalic acid such as the reaction product of 1,6-hexanediol, glycerol and phthalic anhydride. The preferred ranges of the components is about 70% to about 95% by weight of the oligomer and about 5% to about 30% by weight of the polyol.

EXAMPLE 2

A two liter flask with Barrett trap, an upright condenser, stirrer and gas inlet were charged with dry nitrogen flow of 0.2 SCFH and stirring with 650 g. of xylene and 84 g. of a hydroxy terminated polyester. The hydroxy terminated polyester was made by charging a five liter flask with 1543.48 g. of phthalic anhydride, 1464.42 g. of 1,6-hexanediol, 192.10 g. of glycerol, and 2.88 g. of dibutyltin bis lauryl mercaptide catalyst. The reaction was run in a similar manner to the esterification of Example 1, and yielded about 3000 grams of a polyester polyol with an hydroxyl number of 107 and an equivalent weight of 524.

The xylene and hydroxy terminated polyester were heated to distill 88 ml. of xylene and then cooled until phase separation occurred at about 70° C. The Barrett trap was removed and the upright condenser was put directly on the flask. The composition was then reheated to 15 deg. above the clear point or about 85° C. Then with the mantle turned off and water bath handy, 476 g. of Desmodur N-100 and 200 g. of xylene were charged and stirred at a temperature of about 50° C. to about 70° C. until any exotherm was completed. Then the temperature was raised to 100° C., held for 15 minutes and cooled to 35° C. Then 5.58 g. of dibutyltin dilaurate catalyst was charged. The composition was heated and/or the bath used as necessary to raise the temperature to 60° C. and held for 90 min. The composition was then cooled to less than 30° C. under nitrogen and 650 g. poured into a quart jar containing 1.3 g. of Tinuvin 1130 and 1.3 g. of Tinuvin 292 (UV stabilizers sold by Ciba Geigy). The composition was then purged with nitrogen, sealed and placed on rollers to dissolve the stabilizers. Another portion was poured into a quart jar without the stabilizers.

As the weight percent of polyester is reduced, the $T_g$ increases as shown in Example 3.

EXAMPLE 3

Three urethane compositions were made having varying percent of polyester. The first, Sample 3A, was made by charging a one liter flask with Barrett trap, an upright condenser, stirrer and gas inlet with dry nitrogen glow of 0.25 SCFH and stirring with 188 g. of n-butyl acetate and 89.9 g. of a hydroxy terminated polyester. The hydroxy terminated polyester had an acid number 0.26, an hydroxyl number of 169 and therefore an equivalent weight of 332. It was made from 20 equivalents of phthalic anhydride, 29.2 equivalents of 1,6-hexanediol and 0.30 equivalents of glycerine.

The n-butyl acetate and hydroxy terminated polyester were heated to distill 43 ml. of butyl acetate and then cooled to about 30° C. The Barrett trap was removed and the upright condenser was put directly on the flask. Then with the mantle turned off and water bath handy, 210 g. of Desmodur N-3300 was charged and stirred to about 90° C., held for 30 min. and cooled to 45° C. Then 3.0 g. of dibutyltin dilaurate catalyst and 0.3 g. of DC-193 (a wetting agent manufactured by Dow Corning) were charged. The temperature was raised to 60° C. and held for 90 min. The composition was then cooled to less than 30° C. under nitrogen and 650 g. poured into a pint can and flushed with nitrogen. Sample 3A represents 70% Desmodur N-3300 and 30% polyester on a solids basis.

Sample 3B was made in the same manner except 67.5 g. of the polyester and 232.4 g. of Desmodur N-3300 were used. Sample 3B represents 77.5% Desmodur N-3300 and 22.5% polyester on a solids basis.

Likewise, Sample 3C was made in the same manner except only 45.0 g. of polyester and 255 g. of Desmodur N-3300 were used. Sample 3C represents 85% Desmodur N-3300 and 15% polyester on a solids basis.

The glass transition temperature of the cured and dried films of Samples 3A, 3B and 3C were 42° C., 55° C. and 78° C. respectively. Therefore, as the percent polyester decreases, the $T_g$ increases.

EXAMPLE 4

The preferred embodiment is a combination of the first two embodiments. The polyester was made by charging to a three liter, five-necked flask, equipped with an upright steam heated condenser, mechanical stirrer, thermometer, gas inlet and heating mantle, 557 g. of isophthalic acid, 407 g. of phthalic anhydride, 854 g. 1,6-hexanediol, 150 g. trimethylol propane, 32.4 g. diethylene glycol and 2.0 g. dibutyltin bis lauryl mercaptide. The dibutyltin catalyst can be omitted from the composition. The mixture was heated with stirring under a trickle of nitrogen to 220° C. The nitrogen flow was then gradually increased to 1 scfm and these conditions held until the acid number of 0.25 was obtained. The water of esterification collected totaled 174 ml. The polyester had an hydroxyl number of 190 (eq. wt. =295).

A 39% solids Desmodur W prepolymer solution was prepared by charging a one liter flask equipped with mantle, stirrer, thermometer, still head and gas inlet with 371 g. xylene and 190 g. of the polyester. Forty-seven ml. of the xylene was distilled, the composition cooled to 50° C. and charged with 140.0 g. of dicyclohexylmethane-4,4'-diisocyanate (Desmodur W from Mobay Chemical Company) and 1.00 g. of dimethyltin dineodecanoate. The composition was heated gradually to 95° C. and held for 30 min. Then the composition was cooled to near room temperature under nitrogen and charged with 186 g. of xylene, 4.00 g. of BYK 077 anti-foam (manufactured by BYK Chemie) and 2.00 g. of an ethoxylated dimethyl siloxane leveling agent (DC-193 manufactured by Dow Corning).

A 39% solids polyisocyanate solution was prepared by stirring together 112 g. of Mobay Chemical Company's Desmodur N-751 (a 75% solution of a biuret of 1,6-hexamethylene diisocyanate in butyl acetate), with 79.4 grams of xylene and 24.0 grams of anhydrous butyl acetate in a sealable container while purging with nitrogen. After stirring the container was sealed.

The Seam Coater was prepared by stirring in a sealable container 85.0 g. of the 39% Desmodur W prepolymer solution and 15.0 g. of the 39% polyisocyanate solution while purging with nitrogen. The container was then sealed.

Both the 39% solids Desmodur W prepolymer solution and the Seam Coater may be used as ambient cure seam sealers and/or coaters. However, the Seam Coater is preferred due to its more rapid development of strength at ambient conditions. These material bond very well to vinyl and polyurethane films as well as to the aminoplast wear layers.

When the Seam Coater was applied to a glass plate with a six mil Bird blade and placed in a 120° C. oven for 30 minutes, the hard, tough 2-3 mil film obtaioned has a mid-point DSC $T_g$ of 51.5° C. (DSC heat up rate of 20 deg. per min.). The film was not stained upon four hour contact with shoe polish, hair dye, ballpoint pen ink or Magic Marker at 72° F. Tincture of iodine stained it slightly.

The 39% solids Desmodur W prepolymer solution was similarly coated and cured producing a similar film with a $T_g$ of 55.5° C. This film resisted all five staining agents. This indicates the suitability of these polymers as high performance flooring wear layers.

The adhesion between the seam coater of the present invention and some wear layers is improved by scouring the seam with various felts or paper products saturated with an organic solvent, or with a finely divided inorganic powder, such as limestone, Bon Ami, or Comet, before application of the seam coater. Such powders can be used with a wet or dry cloth, and in fact a convenient method is to employ Soft Scrub which is an aqueous paste of an inorganic powder. More preferable, however, is the use of a paste of such powders as limestone (mean particle size of about 3.0 microns) in a hydrocarbon solvent. The limestone and solvent is put on a soft dry cloth (or piece of felt) and modest pressure is applied to the seam with a index finger wrapped in the felt. The excess paste is removed with clean soft dry cloths. Using this paste is a good way to clean up the seam even when it is not needed for adhesion.

The seam coater is then applied with an eye dropper or needle nose capped squeeze bottle. The seam should be protected from dirt and traffic until it cures. With some products, the seam coater is applied with a special applicator that puts coater into the seam as well as on top. This results in edge-to-edge adhesion as well as adhering a coating on top of the seam.

If reduced dry time is desired, the seam coater can be used as a two part system. Just before use, up to about 1.2 eqs. per eq. of unreacted NCO of a low molecular weight polyol can stirred into the seam coater composition. For example, 2.8 g. of 1,3-butanediol per 100 g. of seam coater produced a mixture with a working time of about 20 minutes and dried to touch on the seam in about 2.5 hours. Without the 1,3-butanediol, the drying time is about seven hours. The mixture was coated on glass with a 3 mil Bird blade to determine the $T_g$. The glass transition temperature, after curing in an oven at 130° C. for 30 minutes, was 57° C.

What is claimed is:

1. A floor covering comprising a urethane component having a glass transition temperature of at least 40° C.

2. The floor covering of claim 1, wherein the urethane component comprises a polyurethane/urea.

3. The floor covering of claim 1, wherein the urethane component comprises the reaction product with water of a moisture curable urethane prepolymer.

4. The floor covering of claim 3, wherein the urethane component comprises the reaction product with water of a moisture curable blend of a polyisocyanate and a moisture curable urethane prepolymer.

5. The floor covering of claim 3, wherein the urethane component is a wear layer.

6. The floor covering of claim 3, wherein the urethane component is a seam sealer or a seam coater.

7. The floor covering of claim 2, wherein the urethane component is the reaction product of a composition comprising a polyurethane prepolymer and water, the prepolymer being prepared by the reaction of an equivalent excess of a polyisocyanate and a hydroxy terminated polyester.

8. A floor covering comprising a urethane component having a glass transition temperature of at least 40° C., wherein the urethane component is the reaction product of a composition comprising a polyurethane prepolymer; a multifunctional, isocyanato-terminated oligomer of an aliphatic polyisocyanate; and water, the polyurethane prepolymer being prepared by the reaction of an equivalent excess of a cycloalkyl diisocyanate and a hydroxy terminated polyester.

9. The floor covering of claim 7, wherein the polyisocyanate is selected from the group consisting of bis(4-isocyanatocyclohexyl)methane.

10. The floor covering of claim 9, wherein the polyester has an equivalent weight of about 200 to about 700 and is the reaction product of a composition comprising an aromatic diacid or anhydride, and a polyol selected from the group consisting of diethylene glycol, 1,6-hexanediol, cyclohexanedimethanol, 2-methyl-1,3-propanediol and 1,4-butanediol.

11. The floor covering of claim 7, wherein the polyisocyanate is bis(4-isocyanatocyclohexyl)methane in an amount from about 1.1 eq. to about 3.5 eq. based on the hydroxy terminated polyester, and wherein the hydroxy terminated polyester has an equivalent weight of about 200 to about 700 and is the reaction product of isophthalic acid with about 0.15 eq. to about 0.25 eq. of triethylene glycol, about 0.5 eq. to about 0.7 eq. of diethylene glycol, about 0.2 eq. to about 0.35 eq. of ethylene glycol and about 0.1 eq. to about 0.3 eq. of glycerine per 1 eq. of isophthalic acid.

12. The floor covering of claim 7, wherein the polyisocyanate is bis(4-isocyanatocyclohexyl)methane in an amount from about 1.45 eq. to about 1.85 eq. per 1 eq. of polyester polyol, and wherein the polyester polyol has an equivalent weight of about 250 to about 350 and is the reaction product of a composition comprising phthalic anhydride, isophthalic acid and 1,6-hexanediol.

13. The floor covering of claim 12, wherein a trimer selected from the group of an isocyanurate, a biuret of 1,6-hexamethylene diisocyanate and mixtures thereof is blended with the polyurethane prepolymer in an amount of from about 5 wt % to about 50 wt % of the polyurethane prepolymer prior to the reaction with the water.

14. The floor covering of claim 3, wherein the urethane component layer is the reaction product of a composition comprising a polyurethane prepolymer prepared by the reaction of a multifunctional, isocyanato-terminated oligomer of an aliphatic polyisocyanate, a polyol and water.

15. The floor covering of claim 14, wherein the oligomer is an isocyanurate trimer of hexamethylene diisocyanate.

16. The floor covering of claim 14, wherein the polyol is a hydroxy terminated polyester.

17. The floor covering of claim 16, wherein the polyester is the reaction product of a polyol and phthalic anhydride.

18. The floor covering of claim 17, wherein the polyester is the reaction product of 1,6-hexanediol, glycerol and phthalic anhydride.

19. The floor covering of claim 14, wherein the oligomer is a biuret of hexamethylene diisocyanate.

20. The floor covering of claim 14, wherein the composition comprises about 70% to about 95% by weight of the multifunctional, isocyanato-terminated oligomer and about 5% to about 30% by weight of the polyol.

* * * * *